United States Patent
Xu et al.

(10) Patent No.: US 12,542,706 B2
(45) Date of Patent: *Feb. 3, 2026

(54) AUTOMATED CROSS-SERVICE DIAGNOSTICS FOR LARGE SCALE INFRASTRUCTURE CLOUD SERVICE PROVIDERS

(71) Applicant: Microsoft Technology Licensing, LLC, Redmond, WA (US)

(72) Inventors: Zhangwei Xu, Redmond, WA (US); Xiaofeng Gao, Redmond, WA (US); Cary L. Mitchell, Bellevue, WA (US); Steve J. Lunsman, Redmond, WA (US); Tony V. Perez, Bothell, WA (US); Arvind Narasimhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,083

(22) Filed: Mar. 18, 2024

(65) Prior Publication Data
US 2024/0223436 A1    Jul. 4, 2024

Related U.S. Application Data

(63) Continuation of application No. 17/382,072, filed on Jul. 21, 2021, now Pat. No. 11,962,456.

(51) Int. Cl.
*H04L 41/0631* (2022.01)
*H04L 41/0654* (2022.01)
(Continued)

(52) U.S. Cl.
CPC ........ *H04L 41/065* (2013.01); *H04L 41/0654* (2013.01); *H04L 41/0686* (2013.01); *H04L 41/22* (2013.01); *H04L 43/091* (2022.05)

(58) Field of Classification Search
CPC ............... H04L 41/065; H04L 41/0654; H04L 41/0686; H04L 41/22; H04L 43/091
(Continued)

(56) References Cited

U.S. PATENT DOCUMENTS 10,318,366 B2 * 6/2019 Qi ........................... H04L 41/00
11,354,131 B2 * 6/2022 Balasubramanian ........................
G06F 9/3838

(Continued)

OTHER PUBLICATIONS

Ardissono et al., Fault Tolerant Web Service Orchestration by Means of Diagnosis, Software Architecture: Third European Workshop, Feb. 16, 2006 (Year: 2006).*

(Continued)

*Primary Examiner* — David P Zarka

(57) ABSTRACT

Example aspects include techniques for employing cross-service diagnostics for cloud service providers. These techniques may include dynamically generating a workflow of one or more diagnostic modules based on relationship information between an origin service experiencing an incident and one or more related services that the origin service depends on, and executing the workflow of one or more diagnostic modules to determine a root cause of the incident, each of the one or more diagnostic modules implemented by an individual service of the one or more related services in accordance with a schema. In addition, the techniques may include determining a diagnostic action based on the root cause, and transmitting, based on the diagnostic action, an engagement notification to a responsible entity.

20 Claims, 5 Drawing Sheets

(51) Int. Cl.
*H04L 41/0686* (2022.01)
*H04L 41/22* (2022.01)
*H04L 43/091* (2022.01)

(58) Field of Classification Search
USPC .......................................................... 709/224
See application file for complete search history.

(56) References Cited

U.S. PATENT DOCUMENTS

| 11,962,456 | B2* | 4/2024 | Xu | H04L 41/22 |
| 2004/0199627 | A1* | 10/2004 | Frietsch | H04L 41/0677 |
| | | | | 709/224 |
| 2016/0188370 | A1* | 6/2016 | Razin | G06F 11/3495 |
| | | | | 718/104 |
| 2017/0373925 | A1* | 12/2017 | Abrams | G06F 11/079 |
| 2022/0308862 | A1* | 9/2022 | Espinha | G06N 20/00 |

OTHER PUBLICATIONS

Jia, et al., "SFDCloud: Top-k Service Faults Diagnosis in Cloud Computing", In Journal of Automated Software Engineering, vol. 21, Issue 4, Oct. 19, 2013, pp. 461-488.
Soldani, et al., "Anomaly Detection and Failure Root Cause Analysis in (Micro)Service-Based Cloud Applications: a Survey", In Repository of arxiv:2105.12378v1, May 26, 2021, 36 Pages.

* cited by examiner

AUTOMATED CROSS-SERVICE DIAGNOSTICS FOR LARGE SCALE INFRASTRUCTURE CLOUD SERVICE PROVIDERS

CROSS-REFERENCE TO RELATED APPLICATIONS

This application claims the benefit of U.S. application Ser. No. 17/382,072 filed Jul. 21, 2021, entitled "Automated Cross-Service Diagnostics for Large Scale Infrastructure Cloud Service Providers," which is incorporated herein by reference in its entirety.

BACKGROUND

Cloud computing systems may be composed of interdependent layers and/or services. For example, a cloud computing system may include a compute service, a storage service, a virtualization service, and a network service that combine to provide one or more applications. Due to the interdependency among the services, incidents within a service may be related to or resulting from issues arising within one or more other services. Typically, incidents are investigated locally by engineers having an expertise limited to an originating service, while requiring the engineers to produce diagnostic information that could be used downstream. For example, an engineer for the storage service may investigate an issue initially detected within the storage service but caused by an issue within another service. Accordingly, the engineers often produce ad-hoc diagnostic information that is incorrect and/or insufficient, and/or perform different actions in response to the same type of incident. As a result, incidents may be transferred between multiple engineers before arriving at the responsible team, thereby increasing the time to mitigate, prolonging potential service level agreement (SLA) breaches, and/or negatively impacting customer experience.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include dynamically generating including one or more diagnostic modules based on relationship information between an origin service experiencing an incident and one or more related services that the origin service depends on, and invoking the one or more diagnostic modules to determine a root cause of the incident, each of the one or more diagnostic modules implemented by an individual service of the one or more related services. Further, the method may include determining a diagnostic action based on the root cause, and transmitting, based on the diagnostic action, an engagement notification to a responsible entity.

In another aspect, a device may include a memory storing instructions and at least one processor coupled with the memory and configured to execute the instructions to dynamically generate a workflow including one or more diagnostic modules based on relationship information between an origin service experiencing an incident and one or more related services that the origin service depends on, invoke the one or more diagnostic modules to determine a root cause of the incident, each of the one or more diagnostic modules implemented by an individual service of the one or more related services, determine a diagnostic action based on the root cause, and transmit, based on the diagnostic action, an engagement notification to a responsible entity.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for employing cross-service diagnostics for cloud service providers. In particular, aspects of the present disclosure provide a system configured to invoke service specific diagnostic modules in accordance with an extensible interface, and effectively and efficiently run automatic diagnosis optimized for an easy authoring experience on a large scale cloud service provider. Accordingly, for example, a cloud service provider may employ the orchestration module/engine to provide a scalable diagnosis method that reduces time to engage and time to mitigate.

In a cloud infrastructure environment, issue diagnosis is a largely inefficient process due to the large number of services, teams, dependencies, and engineers involved. Further, due to amount of services in a modern cloud environment, issue diagnosis often results in an issue ticket being transferred between multiple service teams before the correct service team is identified. In addition, many automated diagnosis implementations perform diagnostics in silos and fail to share diagnostic information with each other, which may lead to inefficient incident handling, poor reusability, and increased time-to-mitigate. In accordance with some aspects of the present disclosure, a diagnosis orchestration module may be configured to invoke service specific diagnostic modules and perform cross-service diagnosis using each individual service's diagnosis result as a hint for the next level of diagnosis. In this design, each service will implement their diagnostic module based on a common standard diagnostic interface which provides a common way to describe diagnosis input and output at a service resource/component level and a bridge to convert diagnostic context between customer and service, and service and service. In addition, the diagnosis output of the diagnostic modules may be used to determine a diagnosis result. Based on the diagnosis result and a predicted accuracy of the diagnosis result, one or more mitigation routing actions may be executed automatically. Accordingly, the systems, devices, and methods described herein provide techniques for performing comprehensive diagnosis before incident routing to drastically reduce time to engage and expedite issue mitigation.

Illustrative Environment

Figure 1:
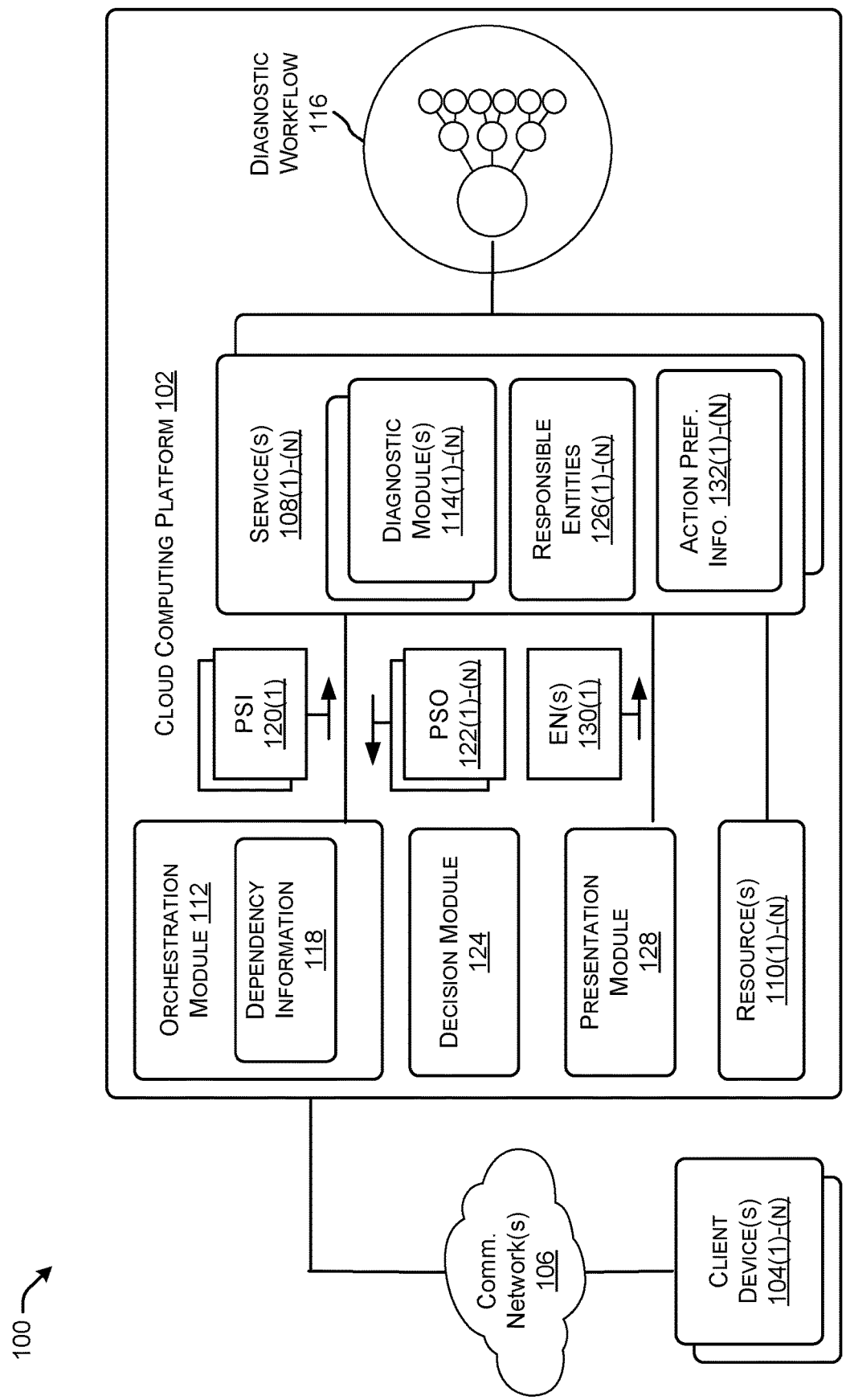
FIG. 1 is a diagram showing an example of a cloud computing system, in accordance with some aspects of the present disclosure

FIG. 1 is a diagram showing an example of a cloud computing system 100, in accordance with some aspects of the present disclosure.

As illustrated in FIG. 1, the cloud computing system 100 may include a cloud computing platform 102, and a plurality of client devices 104(1)-(n). The cloud computing platform 102 may provide the client devices 104(1)-(n) with distributed storage and access to software, services, files, and/or data via a communications network 106, e.g., the Internet, intranet, etc. Some examples of the client devices 104(1)-(n) include smartphone devices and computing devices, Internet of Things (IoT) devices, drones, robots, process automation equipment, sensors, control devices, vehicles, transportation equipment, tactile interaction equipment, virtual and augmented reality (VR and AR) devices, industrial machines, etc. Further, in some aspects, a client device 104 may include one or more applications configured to interface with the cloud computing platform 102.

As illustrated in FIG. 1, the cloud computing platform 102 may include a plurality of services 108(1)-(n), a plurality of resources 110(1)-(n), and an orchestration module 112. Some examples of service types include infrastructure as a service (IaaS), platform as a service (PaaS), software as a service (SaaS), database as a service (DaaS), security as a service (SECaaS, big data as a service (BDaaS), a monitoring as a service (MaaS), logging as a service (LaaS), internet of things as a service (IoTaaS), identity as a service (IDaaS), analytics as a service (AaaS), function as a service (FaaS), and/or coding as a service (CaaS). Further, each service 108 may be associated with one or more service level agreements (SLAs) defining a level of service provided by a service 108 to a client device 104 or a plurality of the client devices 104. As described herein, a "SLA" may refer to a contract between the provider of a service (e.g., the cloud computing platform 102) and a customer that defines which services the provider will offer and the level of performance it must meet as well as any remedies or penalties should the agreed-upon levels not be realized. In some aspects, SLAs typically establish customer expectations for a provider's performance and quality. In some examples, the level of service may include a performance guarantee and/or availability guarantee. Some examples of the resources 110(1)-(n) may include computing units, bandwidth, data storage, application gateways, software load balancers, memory, field programmable gate arrays (FPGAs), graphics processing units (GPUs), input-output (I/O) throughput, or data/instruction cache. As described in detail herein, the resources 110(1)-(n) may be reserved for use by the services 108(1)-(n).

As described in detail herein, incidents may occur on the cloud computing platform 102 and affect one or more services 108. For example, one or more components of a service 108 may suffer a temporary outage due to an unknown cause. Further, the incidents may significantly affect the ability of the cloud computing platform 102 to meet the SLAs and/or cause costly downtime of one or more services 108. As such, as described herein, the cloud computing platform 102 may be configured to minimize the time to mitigate (TTM) an incident. As used herein, the TTM may include the time to detect (TTD) (i.e., the time from the start of an incident's impact on a service to the time that the incident is visible to the cloud computing platform 102), time to engage (TTE) (i.e., time from detection of the incident until the time the appropriate engineer and/or repair component is engaged with the incident), and time to fix (TTF) (i.e., the time that it takes a responder to mitigate the incident).

The orchestration module 112 may be configured to monitor and manage incident responses by the cloud computing platform 102. As described herein, in some aspects, the orchestration module 112 may not include diagnostic logic. Instead, the orchestration module 112 may be configured to invoke a plurality of diagnostic modules 114(1)-(n) implemented by the services 108(1)-(n) in accordance with an extensible schema. Further, the orchestration module 112 may include correlation logic for correlation diagnostic action within the cloud computing platform 102. Further, in some aspects, the cloud computing platform 102 may include a global actor including logic for diagnosing global incidents. As an example, a first service 108(1) may implement a first diagnostic module 114(1) configured to receive a predefined input type and generate diagnostic information for the first service 108(1) in a predefined output type in accordance with a contract of the extensible schema, a second service 108(2) may implement a second diagnostic module 114(2) configured to receive the predefined input type and generate diagnostic information for the second service 108(2) in the predefined output type in accordance with the contract of the extensible schema, a nth service 108(n) may implement a nth diagnostic module 114(n) configured to receive the predefined input type and generate diagnostic information for the nth service 108(n) in the predefined output type in accordance with the contract of the extensible schema, and so forth. As another example, a first service 108(1) may implement a first diagnostic module 114(1) configured to receive a predefined input type and generate diagnostic information for a first component of the first service 108(1) in a predefined output type in accordance with the contract of the extensible schema, the first service 108(1) may implement a second diagnostic module 114(2)

configured to receive the predefined input type and generate diagnostic information for a second component of the first service 108(1) in the predefined output type in accordance with the contract of the extensible schema, a nth service 108(n) may implement a nth diagnostic module 114(n) configured to receive the predefined input type and generate diagnostic information for a component of the nth service 108(n) in a predefined output type in accordance with the contract of the extensible schema, and so forth. The use of the extensible scheme allows for easy implementation of diagnostic modules 114, which may permit service operators to quickly add logic addressing different types of incidents without system disruption. As such, incident handling within the cloud computing platform 102 may be optimized for use by a large scale cloud service provider as the orchestration module 112 is configured for scalability and can handle large volumes of incidents.

In some aspects, the predefined input type may include one or more resource identifiers each associated with a resource 110 affected by the incident, a type of resource affected by the incident, and/or an incident information (e.g., an identifier of a symptom of the incident, an identifier of one or more regions, datacenters, and/or clusters affected by the incident). Some examples of a resource type include virtual machine, storage, application gateway, software load balancer, etc. Further, the predefined output type may include a health status of the corresponding service 108 and/or a component of the corresponding service 108, and dependency information identifying one or more related services 108 that the service 108 corresponding to the invoked diagnostic module 114 depends on. Some examples of the health status include healthy, unhealthy, degraded, and inconclusive. Further the status may be associated with a reason or support for the status, e.g., a failed alert, failure to receive a heartbeat, failed test.

Given that each diagnostic module 114 is configured to accept input and provide output in a common schema at resource/component level, the cloud computing platform 102 may implement a central cross-service diagnostic workflow 116 dynamically determined by the orchestration module 112. As described herein, the cross-service diagnostic workflow 116 may define the one or more diagnostic modules 114 that should be invoked to determine the root cause of an incident on the cloud computing platform 102. As used herein, in some aspects, dynamically determining the diagnostic workflow may refer to determining the diagnostic modules 114 of the diagnostic workflow and an order for invoking the diagnostic modules of the diagnostic workflow in response to detection of the incident by querying diagnostic modules 114 associated with the incident as opposed to relying on a centralized resource that maintains potentially outdated dependency information and/or centralized diagnostic logic that fails to incorporate up to date expert incident response techniques. Accordingly, a particular service 108 may add, modify, and remove the diagnostic modules 114 of the service 108 without affecting diagnosis efforts with respect to other services 108.

For example, the orchestration module 112 may be informed of an incident negatively impacting a first service 108(1). In response, the orchestration module 112 may invoke one or more diagnostic modules 114 in accordance with the diagnostic workflow 116. Further, the orchestration module 112 may determine the diagnostic workflow 116 by determining dependency information 118 of the first service 108(1), e.g., a dependency tree or directed dependency graph, and invoking the diagnostic modules 114 corresponding to the dependencies of the first service 108(1). For instance, in response to detecting the incident affecting the first service 108(1), the orchestration module 112 may invoke the first diagnostic module 114(1) corresponding to the first service 108(1) using predefined schema input (PSI) 120(1) of the predefined schema type. In response, the first diagnostic module 114(1) may generate the predefined schema output (PSO) 122 of the predefined schema type, and transmit the predefined schema output 122(1) to the orchestration module 112. For example, the first diagnostic module 114(1) may transmit the health status of the first service 108, and a list of related services 108 that the first service 108(1) depends on and may be the root cause of the incident. In some aspects, the first service 108(1) may determine the one or more services 108 that the first service 108(1) depends on, identify which of the one or more services may be associated with the incident, and transmit the identified services 108 within the list of related services 108. In addition, a diagnostic module 114(1) may identify the one or more services 108 that may be associated with the incident based on the status of operations at the corresponding first service 108(1).

Further, in response to receipt of predefined schema output 122, the orchestration module 112 may determine whether another level of diagnosis needs to be performed (i.e., whether the first service 108(1) corresponding to the first diagnostic module 114(1) that transmitted the predefined schema output 122 to the orchestration module 112 has dependencies requiring another level of diagnosis). For example, if the list of related services 108 within the predefined schema output 122(1) is not empty, the orchestration module 112 may use the predefined schema output 122(1) to trigger the next level of diagnosis. In particular, the orchestration module 112 may add the diagnostic modules 114 corresponding to the services 108 identified within the list of related services 108 within the predefined schema output 122(1) to the diagnostic workflow 116, and invoke the diagnostic modules 114 predefined schema output 122 added to the diagnostic workflow 116. In response to being invoked by the orchestration module 112, each of the diagnostic modules 114 may return a predefined schema output 122. Additionally, if any of the returned predefined schema output 122 include a non-empty list of related services 108, the orchestration module 112 may repeat the diagnosis process via the diagnostic modules 114 corresponding to the services 108 within the non-empty list of related services 108, i.e., add the diagnostic modules 114 corresponding to the services 108 identified within the non-empty list of related services to the diagnostic workflow 116 and invoke the diagnostic modules 114. The cross-service diagnosis flow described herein is generic and ensures seamless integration of a diagnostic module 114 with minimal effort. Additionally, or alternatively, in some aspects, the orchestration module 112 may query the services 108 and/or diagnostic modules 114 for the dependency information 118 via another predefined input type and predefined output type, and subsequently invoke the diagnostic modules 114 based on the dependency information 118.

Further, the orchestration module 112 may determine an order for executing the diagnostic workflow 116, i.e., the order of invocation of the diagnostic modules 114 associated with the incident. In some aspects, the orchestration module 112 may employ machine learning or pattern recognition techniques to determine the order for executing the diagnostic workflow 116. For instance, the orchestration module 112 may be configured to give priority based on one or more machine learning features determined to identify services 108 more likely to be the root cause of the incident. Some examples of features that may be used to by a machine learning model to determine invocation priority based on health status, relationship between the corresponding service and the resources affected by the incident, location information of the incident, a date and/or time of the incident, incident signature, title, impacted resource, monitoring identifier, etc. In some aspects, the orchestration module 112 may be trained to invoke the diagnostic modules 114 corresponding to the services 108 in an order that expedites gathering information about services 108 that may been negatively affected by the incident. As such, the orchestration module 112 may be configured to quickly identify the root cause of an incident among the dependencies of a service 108 and/or resource 110. Additionally, or alternatively, the orchestration module 112 may be configured to give invocation priority to diagnostic modules 114 corresponding to services 108 that are depended upon by a service 108 that has indicated that it has a suboptimal health status (e.g., unhealthy, unknown, degraded, etc.). As an example, the orchestration module 112 may be configured to give invocation priority to a service 108 that depends on another service 108 that has been identified as being unhealthy by a corresponding diagnostic module 114, while not giving invocation priority to a service 108 that depends on another service 108 that has been identified as being healthy by a corresponding diagnostic module 114. As such, the orchestration module 112 may be configured to quickly identify the root cause of an incident by prioritizing inspection of services 108 experiencing suboptimal health experiences.

Further, in some aspects, as described above, a plurality of diagnostic modules 114 may be configured to execute diagnostic logic for a service 108. Accordingly, the orchestration module 112 may be further configured to determine which of the plurality of diagnostic modules 114 to invoke for the service 108. In some aspects, the orchestration module 112 may employ machine learning or pattern recognition techniques to determine which of the plurality of diagnostic modules 114 to invoke for the service 108. For example, the orchestration module 112 may be trained to identify a diagnostic module 114 to employ for an incident based upon historic incident information and historic diagnostic information. As a result, the orchestration module 112 helps reduce the run time of the diagnostic workflow 116 by only executing the most relevant diagnostic modules 114, and reduces throttling due to diagnostic module 114 over execution.

As illustrated in FIG. 1, the cloud computing platform 102 may include a decision module 124 configured to determine a root cause of the incident, and a diagnostic action to perform to mitigate the root cause. In some aspects, the decision module 124 may determine the root cause based upon the predefined schema output 122(1)-(n) received from the diagnostic modules 114(1)-(n). For example, the decision module 124 may determine that an incident was due to a particular root cause based upon the health statuses of the services 108 associated with the incident (e.g., the origin service 108 and the related services 108 that the origin service 108 depends on). In some aspects, the orchestration module 112 may generate a signature based on the health statuses of the services 108 associated with the incident, and employ machine learning or pattern recognition techniques to determine the root cause via the signature. Additionally, or alternatively, the decision module 124 may employ one or more heuristic actions to determine the root cause based upon the predefined schema output 122(1)-(n) received from the diagnostic modules 114(1)-(n). In some aspects, each diagnostic module 114 may provide a diagnostic action and the decision module 124 may determine one or more diagnostic actions to perform from the plurality of diagnostic actions received from the diagnostic modules. For example, the decision module 124 may receive a first recommended diagnostic action from the diagnostic module 114(1) and a second recommended diagnostic action from the diagnostic module 114(2), and select the first diagnostic action over the second diagnostic action based upon the second service 108(2) corresponding to a diagnostic module 114(2) depending on a first service 108(1) corresponding to the diagnostic module 114(1).

Some examples of a diagnostic action include such as incident enrichment (i.e., requesting more information, identifying recommended related documentation, related service mitigation action, e.g., rollback deployment, restart service, etc.), incident transfer (i.e., assign the repair assignment to a service and/or engineer team), incident linking (i.e., determine another incident associated with the incident), incident auto-invite (i.e., notify one or more services and/or teams that should be made aware of the incident), and/or re-execute the diagnostic process. In addition, the diagnostic action may identify one or more responsible entities 126 that will be the target of an instruction to perform the diagnostic action. In some aspects, the one or more responsible entities 126 may be entities associated with a service 108 that is the source service 108 of the root cause. Some examples of responsible entities include engineers assigned mitigation responsibilities, or mitigation agent configured to repair a resource 110 or a service 108 in an auto-mitigation technique. Further, in an auto-mitigation context, the decision module 124 may further determine one or more action parameters for one or more mitigation agents prescribed by the decision module 124.

Further, the decision module 124 may determine an accuracy value defining a confidence of the decision module 124 in the prediction of the root cause. In some aspects, the decision module 124 may determine the diagnostic action based upon the root cause and/or the accuracy value. For example, if the accuracy value is below a first preconfigured threshold, the decision module 124 may issue an incident enrichment instruction as the diagnostic action to supplement the information collected by the cloud computing platform 102, the issue an incident transfer instruction as the diagnostic action when the accuracy value is above a second preconfigured threshold. Further, once the decision module 124 determines the diagnostic action, a presentation module 128 may transmit an engagement notification (EN) 130 to one or more responsible entities 126(1)-(n). As described herein, a responsible entity 126 may be the device of an engineer and/or an agent configured to automatically perform incident mitigation.

Additionally, in some aspects, the decision module 124 may determine the diagnostic action based on action preference information 132(1)-(n). For example, each service 108 may have service-specific action preference information 132. Further, the action preference information 132 may specify different actions to perform in response to a specific root cause and/or accuracy value. For example, the action preference information 132 may specify that the decision module 124 should issue an incident enrichment instruction as the diagnostic action when the accuracy value is less than eighty percent, even though the decision module 124 may normally issue an incident enrichment instruction as the diagnostic action when the accuracy value is less than forty percent.

Additionally, or alternatively, in some aspect, the decision module 124 may employ a plurality of decision components each configured to determine a predicted root cause of the incident and/or a proposed diagnostic action to perform to mitigate the root cause based on different logic, e.g., each decision component may employ a different ML model or combination of ML models to determine a predicted root cause of the incident and/or a proposed diagnostic action to perform to mitigate the root cause based on different logic. Further, in some aspects, the decision module 124 may be configured to weight each candidate root cause based on the corresponding decision component to determine the root cause, and/or weight each candidate diagnostic action based on the corresponding decision component to determine the diagnostic action.

In addition, as illustrated in FIG. 1, the cloud computing platform 102 may include the presentation module 128 configured to present a graphical user interface (GUI) displaying monitoring information, incident information, and/or diagnostic information. For example, the presentation module 128 may generate a GUI displaying at least one of incident information, dependency information, the diagnostic workflow 116, the results of executing the diagnostic workflow, the root cause, the accuracy value, and/or the diagnostic action. In addition, the GUI may be configured to receive input information from an engineer. For example, the presentation module 128 may receive textual data correcting the incident information. Further, in some aspects, the orchestration module 112 may re-execute the diagnostic workflow based on input information received from via the GUI. For example, an engineer may update a time value representing the first occurrence of the incident and/or add a storage resource 110 to a list of resources 110 affected by the incident. In addition, the cloud computing platform 102 may re-execute the diagnosis process with the updated time value and updated list of resources 110 associated with the incident. As a result, the predefined schema input 120 provided to the diagnostic modules 114 will include the updated time value and the updated list of resources 110 associated with the incident. Additionally, in some aspects, one or more components of the cloud computing platform (e.g., the orchestration module 112, the decision module 124, the presentation module 128, and/or the diagnostic modules 114) may be incorporated into an incident management system, e.g., an incident management system of a cloud computing service.

Further, in some aspects, the presentation module 128 may identify one or more errors within the incident information, and correct the errors within the incident information to generate corrected incident information. For example, an engineer may update one or more time values by a particular amount of time within the incident information, and the presentation module 128 may detect other data fields that may require the same correction (i.e., include the potential error), and correct the other data fields within the initial incident information to determine updated incident information.

Figure 2:
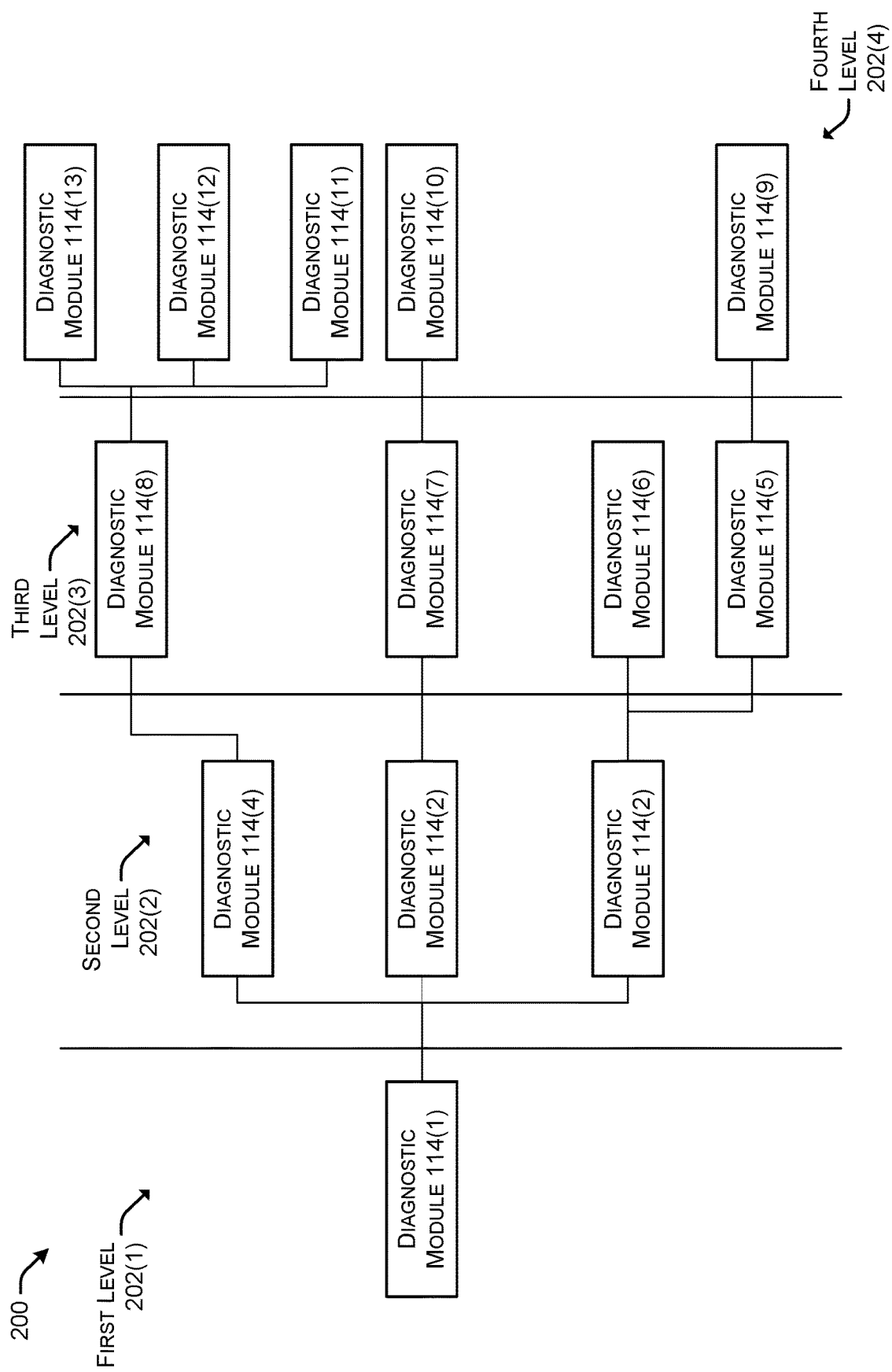
FIG. 2 illustrates an example of a diagnostic workflow within the cloud computing system, in accordance with some aspects of the present disclosure.

FIG. 2 illustrates an example 200 of a diagnostic workflow within the cloud computing system, in accordance with some aspects of the present disclosure. As illustrated in FIG. 2, a diagnostic workflow 116 may include a plurality of diagnostic modules 114(1)-(n). Further, the orchestration module 112 may dynamically determine the diagnostic modules 114 and the order in which the plurality of diagnostic modules 114(1)-(n) will be invoked during a diagnostic process. For example, the orchestration module 112 may invoke the first diagnostic module 114(1) of the first service 108(1) during an execution of a first level 202(1) of the diagnostic workflow 116. Further, invoking the first diagnostic module 114(1) may return the identifiers of the services 108(2)-(4) that the first service 108(1) depends on, and the orchestration module 112 may add the diagnostic modules 114(2)-(4) corresponding to services 108(2)-(4) to the second level 202(2) of the diagnostic workflow 116.

In addition, the orchestration module 112 may invoke at least one of the second diagnostic module 114(2) of the second service 108(2), the third diagnostic module 114(3) of the third service 108(3), or the fourth diagnostic module 114(4) of the fourth service 108(4) during an execution of a second level 202(2) of the diagnostic workflow 116. Additionally, invoking the diagnostic modules 114(2)-(4) may cause each of the diagnostic modules 114(2)-(4) to return the identifiers of the services 108(5)-(8) that the services 108(2)-(4) depend on, respectively, and the orchestration module 112 may add the diagnostic modules 114(5)-(8) corresponding to services 108(5)-(8) to the third level 202(3) of the diagnostic workflow 116.

Further, the orchestration module 112 may invoke at least one of the fifth diagnostic module 114(5) of the fifth service 108(5), the sixth diagnostic module 114(6) of the sixth service 108(6), the seventh diagnostic module 114(7) of the seventh service 108(7), or the eighth diagnostic module 114(8) of the eighth service 108(8) during an execution of a fourth level 202(4) of the diagnostic workflow 116. Further, invoking the diagnostic modules 114(5)-(8) may cause each of the diagnostic modules 114(5)-(8) to return the identifiers of the services 108(9)-(13) that the services 108(5)-(8) depend on, and the orchestration module 112 may add the diagnostic modules 114(9)-(13) corresponding to services 108(9)-(13) to the fourth level 202(4) of the diagnostic workflow 116. As described in detail herein, in some aspects, the orchestration module 112 may determine the order of invocation of the diagnostic modules 114(1)-(13). Further, in some aspects, the orchestration module 112 may invoke a diagnostic module 114 from a higher layer 202 before a diagnostic module 114 in a lower layer 202 based on the health statuses of their corresponding services 108 and/or any other attribute of the corresponding services 108. For example, the orchestration module 112 may invoke the diagnostic module 114(7) before the diagnostic module 114(4) based on the diagnostic module 114(7) being implemented by a service 108(7) that depends on a service 108(2), which the diagnostic module 114(2) has determined is unhealthy.

Figure 3:
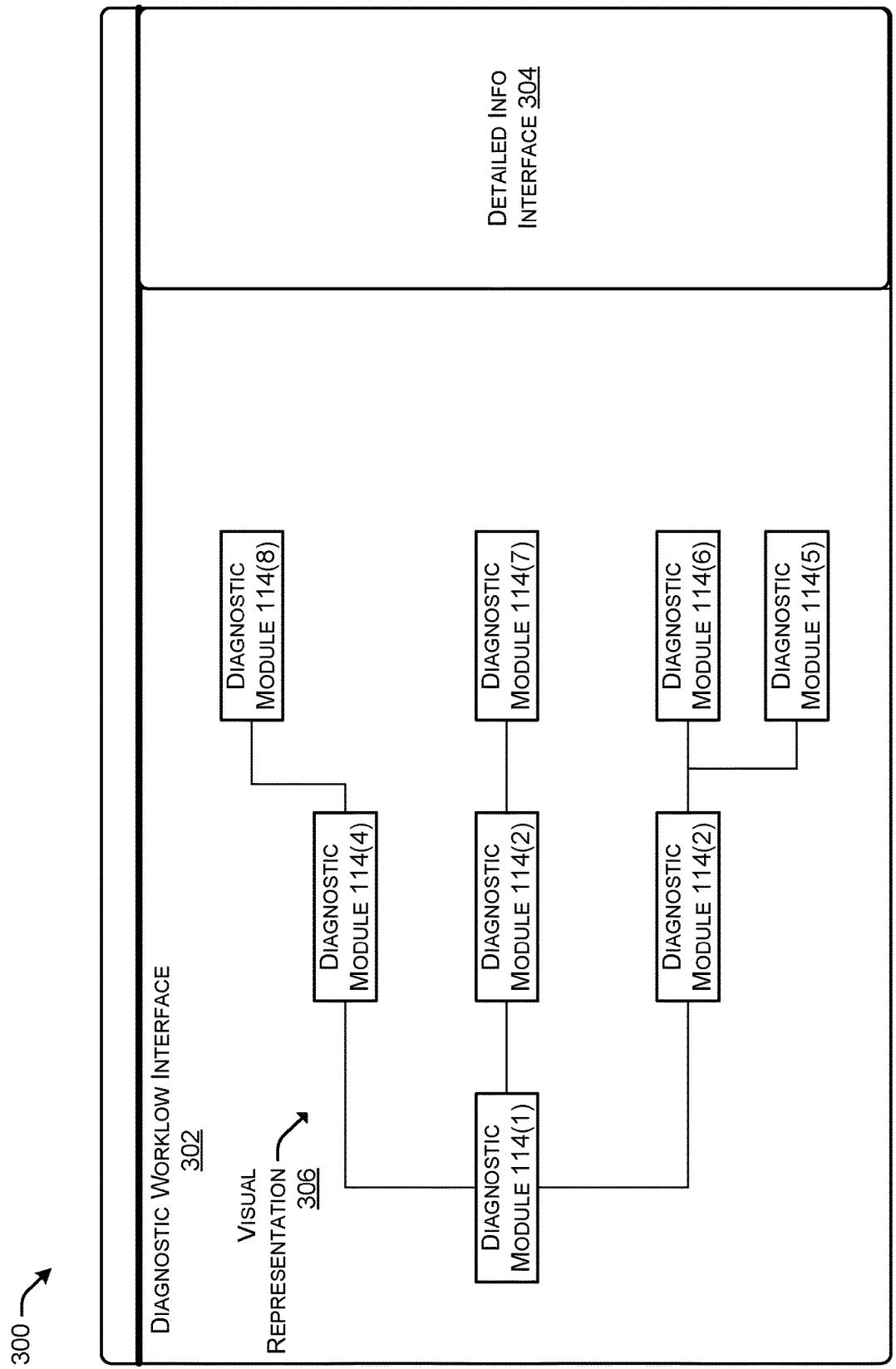
FIG. 3 illustrates an example of a graphical user interface displaying incident information, in accordance with some aspects of the present disclosure.

FIG. 3 illustrates an example of a graphical user interface 300 displaying incident information, in accordance with some aspects of the present disclosure. As illustrated in FIG. 3, the graphical user interface 300 may include a diagnostic workflow interface 302, and a detailed information interface 304. Further, the diagnostic workflow interface 302 may be configured to present a visual representation 306 of a diagnostic workflow (e.g., the diagnostic workflow 116). In addition, the diagnostic workflow interface 302 may apply one or more graphical effects to the visual representation 306. For example, the diagnostic workflow interface 302 may apply use different colors to distinguish between diagnostic modules 114 that have returned healthy statuses and diagnostic modules 114 that have returned sub-optimal health statuses. Further, the visual representation 306 may be configured to display incident information and/or diagnostic information.

Additionally, the detailed information interface 304 may be configured to display the monitoring information, the incident information, and/or the diagnostic information. In addition, the detailed information interface 304 may be configured to receive updates to the monitoring information, the incident information, and/or the diagnostic information. Further, in some aspects, a GUI may provide the ability for engineers to provide feedback on the diagnostic module result which can be used to improve accuracy for certain incident types, as well as provide additional information that may lower or increase the confidence score in a particular modules recommendation.

Example Process

The described processes in FIG. 4 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the cloud computing platform 102. By way of example and not limitation, the method 400 is described in the context of FIGS. 1-3 and 5. For example, the operations may be performed by one or more of the orchestration module 112, the diagnostic modules 114(1)-(n), the decision module 124, and the presentation module 128.

Figure 4:
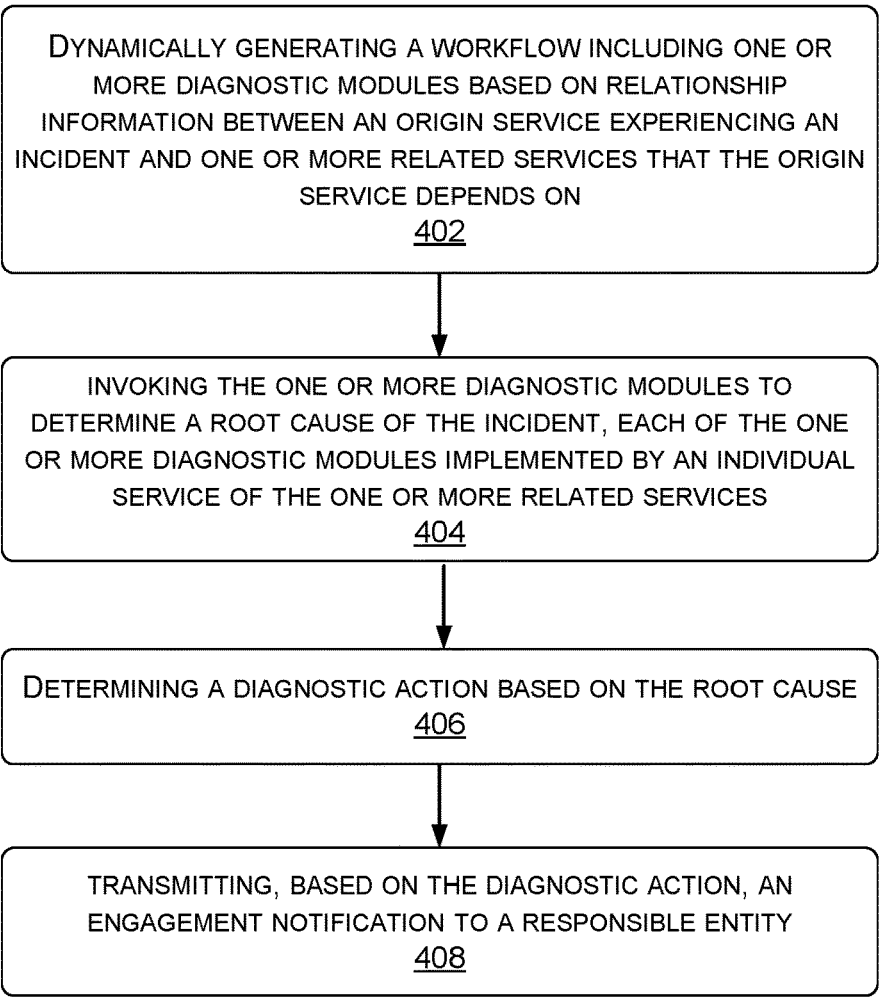
FIG. 4 is a flow diagram illustrating an example method for employing cross-service diagnostics, in accordance with some aspects of the present disclosure.

FIG. 4 is a flow diagram illustrating an example method 400 employing cross-service diagnostics, in accordance with some aspects of the present disclosure.

At block 402, the method 400 may include dynamically generating a workflow including one or more diagnostic modules based on relationship information between an origin service experiencing an incident and one or more related services that the origin service depends on. For example, in response to an incident within the cloud computing platform 102, the orchestration module 112 may generate a diagnostic workflow 116 by adding diagnostic modules 114 to the diagnostic workflow 116 based on the dependency information 118. In particular, if a source service 108 depends on another service, the diagnostic module 114 of the other service 108 may be added to the diagnostic workflow 116. In some aspects, the diagnostic module 114 may only be added to the diagnostic workflow 116 if it is determined that the diagnostic module 114 and/or the corresponding service 108 is potentially relevant to the incident. In some aspects, the diagnostic workflow 116 may be partially generated in response to an incident, and additional diagnostic modules 114 may be added to the diagnostic workflow 116 or diagnostic modules 114 may be removed from the diagnostic workflow 116 at run-time based on the results of previously-executed diagnostic modules 114 of the partially-generated diagnostic workflow 116.

Accordingly, the cloud computing platform 102, the cloud computing device 500, and/or the processor 502 executing the orchestration module 112 may provide means for dynamically generating a workflow including one or more diagnostic modules based on relationship information between an origin service experiencing an incident and one or more related services that the origin service depends on.

At block 404, the method 400 may include invoking the one or more diagnostic modules to determine a root cause of the incident, each of the one or more diagnostic modules implemented by an individual service of the one or more related services. For example, orchestration module 112 may invoke the diagnostic modules 114 of the diagnostic workflow 116 to determine a root cause. In some aspects, the orchestration module 112 may receive health statuses from the diagnostic modules, and the decision module 124 may predict a root cause of the incident based upon the health statuses. For example, the diagnostic modules 114 may determine that a plurality of services 108 depending from a particular same service 108 are all unhealthy, the decision module 124 may determine that the particular service 108 is the origin of the incident. Further, the decision module 124 may determine the root cause based upon recent anomalous activity at the particular service 108.

Accordingly, the cloud computing platform 102, the cloud computing device 500, and/or the processor 502 executing the orchestration module 112 and the decision module 124 may provide means for invoking the one or more diagnostic modules to determine a root cause of the incident, each of the one or more diagnostic modules implemented by an individual service of the one or more related services.

At block 406, the method 400 may include determining a diagnostic action based on the root cause. For example, the decision module 124 may determine one or more diagnostic actions to perform to mitigate the incident based upon the root cause identified by the decision module 124.

Accordingly, the cloud computing platform 102, the cloud computing device 500, and/or the processor 502 executing the decision module 124 may provide means for determining a diagnostic action based on the root cause.

At block 408, the method 400 may include transmitting, based on the diagnostic action, an engagement notification to a responsible entity. For example, the presentation module 128 may transmit an engagement notification 130(1) including the diagnostic action to a responsible party 126(1)

Accordingly, the cloud computing platform 102, the cloud computing device 500, and/or the processor 502 executing the presentation module 128 may provide means for transmitting, based on the diagnostic action, an engagement notification to a responsible entity.

In an additional aspect, in order to invoke the one or more diagnostic modules to determine a root cause of the incident, the method 400 may include sending incident information (e.g., the predefined schema input 120) and a resource identifier of a resource 110 affected by the incident to the one or more diagnostic modules 114, receiving health status information (e.g., predefined schema output 122) from each of the one or more diagnostic modules 114, and determining the root cause of the incident based on the health status information. Accordingly, the cloud computing platform 102, the cloud computing device 500, and/or the processor 502 executing the diagnostic module 114(1) may provide means for sending incident information and a resource identifier of a resource affected by the incident to the one or more diagnostic modules, receiving health status information from each of the one or more diagnostic modules, and determining the root cause of the incident based on the health status information.

In an additional aspect, the method 400 may include presenting, via a graphical user interface, a visual representation of the workflow, the visual representation displaying each of the one or more diagnostic modules with a health status. Accordingly, the cloud computing platform 102, the cloud computing device 500, and/or the processor 502 executing the presentation module 128 may provide means for presenting, via a graphical user interface, a visual representation of the workflow, the visual representation displaying each of the one or more diagnostic modules with a health status.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Illustrative Computing Device

Figure 5:
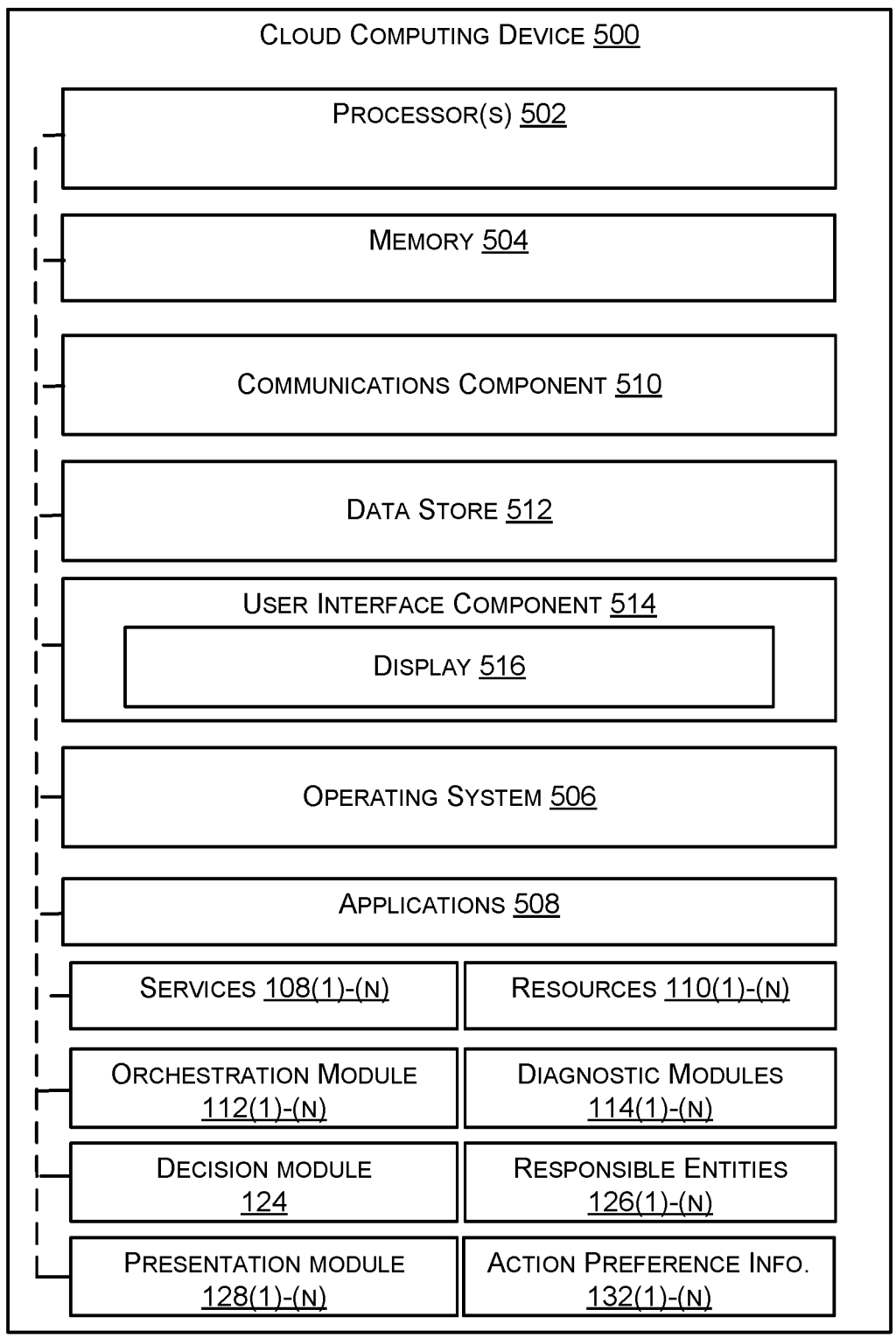
FIG. 5 is a block diagram illustrating an example of a hardware implementation for a cloud computing device, in accordance with some aspects of the present disclosure.

Referring now to FIG. 5, a cloud computing device 500 (e.g., cloud computing platform 102) in accordance with an implementation includes additional component details as compared to FIG. 1. In one example, the cloud computing device 500 includes the processor 502 for carrying out processing functions associated with one or more of components and functions described herein. The processor 502 can include a single or multiple set of processors or multi-core processors. Moreover, the processor 502 may be implemented as an integrated processing system and/or a distributed processing system. In an example, the processor 502 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 502 may include other processing components such as one or more arithmetic logic units (ALUs), registers, or control units.

In an example, the cloud computing device 500 also includes the memory 504 for storing instructions executable by the processor 502 for carrying out the functions described herein. The memory 504 may be configured for storing data and/or computer-executable instructions defining and/or associated with the operating system 506, the services 108(1)-(n), the resources 110(1)-(n), the orchestration module 112, the diagnostics module 114(1)-(n), the decision module 124, the presentation module 128(1)-(n), one or more applications 508, and the processor 502 may execute the operating system 506, the services 108(1)-(n), the orchestration module 112, the diagnostics module 114(1)-(n), the decision module 124, the presentation module 128(1)-(n), and/or the one or more applications 508. An example of memory 504 may include, but is not limited to, a type of memory usable by a computer, such as random access memory (RAM), read only memory (ROM), tapes, magnetic discs, optical discs, volatile memory, non-volatile memory, and any combination thereof. In an example, the memory 504 may store local versions of applications being executed by processor 502.

The example cloud computing device 500 also includes a communications component 510 that provides for establishing and maintaining communications with one or more parties utilizing hardware, software, and services as described herein. The communications component 510 may carry communications between components on the cloud computing device 500, as well as between the cloud computing device 500 and external devices, such as devices located across a communications network and/or devices serially or locally connected to the cloud computing device 500. For example, the communications component 410 may include one or more buses, and may further include transmit chain components and receive chain components associated with a transmitter and receiver, respectively, operable for interfacing with external devices. In an implementation, for example, the communications component 510 may include a connection to communicatively couple the client devices 104(1)-(N) to the processor 502.

The example cloud computing device 500 also includes a data store 512, which may be any suitable combination of hardware and/or software, that provides for mass storage of information, databases, and programs employed in connection with implementations described herein. For example, the data store 512 may be a data repository for the operating system 506 and/or the applications 508.

The example cloud computing device 500 also includes a user interface component 514 operable to receive inputs from a user of the cloud computing device 500 and further operable to generate outputs for presentation to the user. The user interface component 514 may include one or more input devices, including but not limited to a keyboard, a number pad, a mouse, a touch-sensitive display (e.g., display 516), a digitizer, a navigation key, a function key, a microphone, a voice recognition component, any other mechanism capable of receiving an input from a user, or any combination thereof. Further, the user interface component 514 may include one or more output devices, including but not limited to a display (e.g., display 516), a speaker, a haptic feedback mechanism, a printer, any other mechanism capable of presenting an output to a user, or any combination thereof.

In an implementation, the user interface component 514 may transmit and/or receive messages corresponding to the operation of the operating system 506 and/or the applications 508. In addition, the processor 502 executes the operating system 506 and/or the applications 508, and the memory 504 or the data store 512 may store them.

Further, one or more of the subcomponents of the services 108(1)-(n), the orchestration module 112, the diagnostics module 114(1)-(n), the decision module 124, the presentation module 128(1)-(n), may be implemented in one or more of the processor 502, the applications 508, the operating system 506, and/or the user interface component 514 such that the subcomponents of the services 108(1)-(n), the orchestration module 112, the diagnostics module 114(1)-(n), the decision module 124, the presentation module 128(1)-(n), are spread out between the components/subcomponents of the cloud computing device 500.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A cloud computing platform device comprising:
   a memory storing instructions; and
   at least one processor coupled with the memory and configured to execute the instructions to:
   dynamically generate a workflow including one or more diagnostic modules based on relationship information between an origin service experiencing an incident and one or more related services that the origin service depends on, the relationship information comprising dependency information of the origin service indicating the one or more related services upon which the origin service depends, wherein dynamically generating the workflow comprises:
  invoking a first diagnostic module implemented by the origin service or a first related service of the one or more related services;
  receiving at least a portion of the relationship information from the first diagnostic module, the portion of the relationship information identifying a second related service of the one or more related services that the origin service or the first related service depends on; and
  adding a second diagnostic module to the workflow based at least in part on the portion of the relationship information, the second diagnostic module implemented by the second related service;
invoke the one or more diagnostic modules corresponding to the dependency information to determine a root cause of the incident, each of the one or more diagnostic modules implemented by an individual service of the one or more related services and providing a health status corresponding to each of the one or more related services;
determine a diagnostic action based on the root cause and the health statuses; and
transmit, based on the diagnostic action, an engagement notification to a responsible entity.

2. The cloud computing platform device of claim 1, wherein to invoke the one or more diagnostic modules to determine the root cause of the incident, the at least one processor is configured to:
  send incident information and a resource identifier of a resource affected by the incident to the one or more diagnostic modules;
  receive health status information from each of the one or more diagnostic modules; and
  determine the root cause of the incident based on the health status information.

3. The cloud computing platform device of claim 1, wherein to determine the diagnostic action based on the root cause, the at least one processor is configured to determine an accuracy value of the root cause, and to determine the diagnostic action, the at least one processor is configured to determine the diagnostic action based on comparing the accuracy value to a preconfigured threshold.

4. The cloud computing platform device of claim 1, wherein to determine the diagnostic action, the at least one processor is configured to:
  identify a source service that associated with the root cause;
  identify an action preference information associated with the source service; and
  determine the diagnostic action based at least in part on the action preference information.

5. The cloud computing platform device of claim 1, wherein the diagnostic action includes at least one of an incident enrichment action, an incident transfer action, an incident linking action, or an incident auto-invite action.

6. The cloud computing platform device of claim 1, wherein the root cause is a first root cause, the diagnostic action is a first diagnostic action, the engagement notification is a first engagement notification, the responsible entity is a first responsible entity, and the at least one processor is configured to:
  receive, via a user interface, an update to incident information used to dynamically generate the workflow or execute the one or more diagnostic modules;
  re-invoke, based on the update to the incident information, the one or more diagnostic modules to determine a second root cause;
  determine a second diagnostic action based on the second root cause; and
  transmit, based on the second diagnostic action, a second engagement notification to a second responsible entity.

7. The cloud computing platform device of claim 1, wherein the root cause is a first root cause, the diagnostic action is a first diagnostic action, the engagement notification is a first engagement notification, the responsible entity is a first responsible entity, and the at least one processor is configured to:
  identify one or more potential errors within initial incident information based on a user update to the initial incident information;
  correct the one or more potential errors within the initial incident information to determine updated incident information;
  re-invoke, based on the updated incident information, the one or more diagnostic modules to determine a second root cause;
  determine a second diagnostic action based on the second root cause; and
  transmit, based on the second diagnostic action, a second engagement notification to a second responsible entity.

8. The cloud computing platform device of claim 1, wherein the at least one processor is further configured to:
  present, via a graphical user interface, a visual representation of the workflow, the visual representation displaying each of the one or more diagnostic modules with a health status.

9. A method for cross-service diagnostics, comprising:
  dynamically generating a workflow of one or more diagnostic modules based on relationship information between an origin service experiencing an incident and one or more related services that the origin service depends on, the relationship information comprising dependency information of the origin service indicating the one or more related services upon which the origin service depends;
  invoking the one or more diagnostic modules corresponding to the dependency information to determine a first root cause of the incident, each of the one or more diagnostic modules implemented by an individual service of the one or more related services and providing a health status corresponding to each of the one or more related services;
  determining a first diagnostic action based on the first root cause and the health statuses;
  transmitting, based on the diagnostic action, a first engagement notification to a first responsible entity;
  receiving, via a user interface, an update to incident information used to dynamically generate the workflow or execute the one or more diagnostic modules;
  re-invoking, based on the update to the incident information, the one or more diagnostic modules to determine a second root cause;
  determining a second diagnostic action based on the second root cause; and
  transmitting, based on the second diagnostic action, a second engagement notification to a second responsible entity.

10. The method of claim 9, wherein dynamically generating the workflow comprises:
  requesting the relationship information from the one or more related services;

receiving the relationship information from the one or more related services, the relationship information indicating one or more dependencies amongst the one or more related services; and determining an order of execution of the one or more diagnostic modules based at least in part on the relationship information.

11. The method of claim 9, wherein invoking the one or more diagnostic modules to determine the root cause of the incident, comprises:

sending the incident information and a resource identifier of a resource affected by the incident to a diagnostic module of the one or more diagnostic modules;

receiving health status information from the diagnostic module; and determining the root cause of the incident based on the health status information.

12. The method of claim 9, wherein invoking the one or more diagnostic modules to determine the root cause of the incident comprises determining an accuracy value of the root cause; and determining the diagnostic action comprises determining the diagnostic action based on comparing the accuracy value and a predefined threshold.

13. The method of claim 9, wherein the diagnostic action includes at least one of an incident enrichment action, an incident transfer action, an incident linking action, or an incident auto-invite action.

14. The method of claim 9, presenting, via a graphical user interface, a visual representation of the workflow, the visual representation displaying each of the one or more diagnostic modules with a health status.

15. A non-transitory computer-readable device having instructions thereon that, when executed by at least one computing device, causes the at least one computing device to perform operations comprising:

dynamically generating a workflow of one or more diagnostic modules based on relationship information between an origin service experiencing an incident and one or more related services that the origin service depends on, the relationship information comprising dependency information of the origin service indicating the one or more related services upon which the origin service depends;

invoking the one or more diagnostic modules corresponding to the dependency information to determine a first root cause of the incident, each of the one or more diagnostic modules implemented by an individual service of the one or more related services and providing a health status corresponding to each of the one or more related services;

determining a first diagnostic action based on the root cause and the health statuses; and transmitting, based on the first diagnostic action, a first engagement notification to a first responsible entity;

identifying one or more potential errors within initial incident information based on a user update to the initial incident information;

correcting the one or more potential errors within the initial incident information to determine updated incident information;

re-invoking, based on the updated incident information, the one or more diagnostic modules to determine a second root cause;

determining a second diagnostic action based on the second root cause; and transmitting, based on the second diagnostic action, a second engagement notification to a second responsible entity.

16. The non-transitory computer-readable device of claim 15, wherein dynamically generating the workflow comprises:

requesting the relationship information from the one or more related services;

receiving the relationship information from the one or more related services, the relationship information indicating one or more dependencies amongst the one or more related services; and determining an order of execution of the one or more diagnostic modules based at least in part on the relationship information.

17. The non-transitory computer-readable device of claim 15, wherein invoking the one or more diagnostic modules to determine the root cause of the incident comprises:

sending the initial incident information and a resource identifier of a resource affected by the incident to a diagnostic module of the one or more diagnostic modules;

receiving health status information from the diagnostic module; and determining the root cause of the incident based on the health status information.

18. The non-transitory computer-readable device of claim 15, wherein the diagnostic action includes at least one of an incident enrichment action, an incident transfer action, an incident linking action, or an incident auto-invite action.

19. The non-transitory computer-readable device of claim 15, further comprising presenting, via a graphical user interface, a visual representation of the workflow or a dependency graph of the origin service and the one or more related services, the visual representation displaying each of the one or more diagnostic modules with a health status.

20. The non-transitory computer-readable device of claim 15, wherein determining the first diagnostic action comprises determining an accuracy value of the root cause.

* * * * *